United States Patent [19]

Pendergrass, Jr.

[11] Patent Number: 4,490,505
[45] Date of Patent: Dec. 25, 1984

[54] POLYFUNCTIONAL AZIRIDINE CROSSLINKING AGENTS FOR AQUEOUS MAGNETIC RECORDING MEDIA BINDER

[75] Inventor: Daniel B. Pendergrass, Jr., Mendota Heights, Minn.

[73] Assignee: Minnesota Mining and Manufacturing Company, St. Paul, Minn.

[21] Appl. No.: 240,265

[22] Filed: Mar. 16, 1981

Related U.S. Application Data

[63] Continuation-in-part of Ser. No. 141,060, Apr. 17, 1980, abandoned.

[51] Int. Cl.$^3$ .......................... C08L 75/04; B05D 5/12
[52] U.S. Cl. .................................. 524/591; 252/62.54;
427/128; 427/129; 427/130; 427/131; 427/132;
428/69; 428/413; 428/423.7; 428/458; 428/900;
523/402; 524/431; 524/556; 524/603; 524/609
[58] Field of Search .................... 427/127–132,
427/48; 428/900, 69, 413, 423.7, 458;
252/62.54; 523/402; 524/591, 603, 609, 556,
431

[56] References Cited

U.S. PATENT DOCUMENTS

| | | | |
|---|---|---|---|
| 2,933,416 | 4/1960 | Haakh et al. | 524/602 |
| 3,017,280 | 1/1962 | Yudelson | 106/125 |
| 3,225,013 | 12/1965 | Fram | 528/332 |
| 3,499,789 | 3/1970 | Delmore | 428/423.7 |
| 3,901,816 | 8/1975 | Thomas et al. | 252/62.54 |
| 3,983,291 | 9/1976 | Chang | 428/457 |
| 4,263,188 | 4/1981 | Hampton et al. | 260/29.2 TN |
| 4,368,237 | 1/1983 | Yamada et al. | 428/413 |

*Primary Examiner*—Theodore E. Pertilla
*Attorney, Agent, or Firm*—Donald M. Sell; James A. Smith; David R. Cleveland

[57] ABSTRACT

In the manufacture of magnetic recording media, coatings are applied from water-borne dispersions of inorganic particles, a polymer containing functional groups and an agent for crosslinking the polymer, the crosslinking agent being a polyfunctional aziridine such as

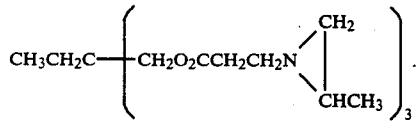

22 Claims, No Drawings

POLYFUNCTIONAL AZIRIDINE CROSSLINKING AGENTS FOR AQUEOUS MAGNETIC RECORDING MEDIA BINDER

CROSS-REFERENCE TO RELATED APPLICATION

This application is a continuation-in-part of copending application Ser. No. 141,060 filed Apr. 17, 1980, now abandoned.

TECHNICAL FIELD

The present invention concerns a magnetic recording medium having a magnetizable layer comprising magnetizable particles in a binder. The invention specifically resides in the binder.

BACKGROUND ART

A typical magnetic recording tape has a flexible plastic backing member carrying a layer of magnetizable particles in a polymeric binder. The tape may also have nonmagnetizable layers which likewise comprise inorganic particles dispersed in a polymeric binder. Other magnetic recording media are disks, drums, cards, etc., and may have rigid backing members. In order to apply either a magnetizable or a nonmagnetizable layer, the binder is usually dissolved in organic solvent which volatilizes. This is both wasteful and pollutes the atmosphere unless the solvent is recovered. The recovery of organic solvents is expensive and can involve danger of explosion and fire.

The aforementioned problems should be minimized by water-borne binders. However, other problems arise. For example, crosslinking agents, which usually are required to provide fully satisfactory physical properties such as good resistance to blocking and to wear, may react with water to form significant quantities of low-molecular-weight compounds that have deleterious effects. Some crosslinking agents have been suggested that are much less reactive with water, but these have required higher temperatures and/or longer times than are suitable for the manufacture of magnetic recording tape. It is not known whether any prior water-borne binder system avoids these problems and thus provides magnetic recording tape coatings having good physical properties such as resistance to blocking and to wear and acceptable magnetic recording properties.

A number of water-borne binder systems have been suggested for magnetic recording tape use, e.g., U.S. Pat. Nos. 3,023,123; 3,795,539; 3,901,816; Japanese Patent Publication No. J 51-103403 dated Sept. 13, 1976, of Hitachi Maxell Co.; and U.S. Defensive Publication No. T 946,007 (of Ser. No. 561,665 filed Mar. 24, 1975). Of these, only U.S. Pat. No. 3,901,816 and the defensive publication disclose water-borne binders which are crosslinkable. The defensive publication has only one working example of a magnetizable coating (Example 1), its binder comprising a copolymer of 85 parts of vinyl acetate and 15 parts of 2-ethylhexyl acrylate with melamine-formaldehyde condensate which is said to be an intra-molecular crosslinking component. However, the copolymer has no functional groups through which it could be crosslinked. If the copolymer contains functional groups such as hydroxyl, amine, carboxyl and epoxy groups, this is said to facilitate crosslinking. However, to so cross-link a melamine-formaldehyde condensate would require higher temperatures than can be tolerated by the most widely used backing members.

The defensive publication gives no information concerning either the magnetic or physical performance of the resultant tapes.

We are not aware of any magnetic recording tapes on the market that were made using water-borne binders.

OTHER PRIOR ART

Polyfunctional aziridines have been used as crosslinking agents for carboxyl-containing polymers as in U.S. Pat. No. 3,017,280 (Yudelson) for photographic emulsions and in U.S. Pat. No. 3,225,013 (Fram) for impregnating and laminating agents. Sales literature of Cordova Chemical Company suggests using polyfunctional aziridines to promote the adhesion of vinyl and acrylic resins containing polycarboxylic acid groups for use as protective coatings.

Syntheses, reactions, uses and potential toxicity of polyfunctional aziridines are discussed in Dermer, O. C., and Ham, G. E., "Ethylenimine and Other Aziridines", Academic Press, 1969.

THE PRESENT INVENTION

The present invention concerns water-borne dispersions of inorganic particles and crosslinking binder systems which provide magnetic recording media having physical and magnetic properties equal to those of presently commercial media made using organic solvents. The novel crosslinking water-borne dispersions have the highly desirable property of providing coatings wherein the binders become sufficiently crosslinked after heating at typical drying times and temperatures. Hence there need be no danger of distorting backing members such as would be involved in using some of the crosslinking water-borne dispersions that have been suggested in the prior art for applying coatings of magnetic recording media.

The novel crosslinking water-borne dispersions tend to have good pot life, equivalent to the pot lives of typical dispersions including crosslinking binder systems in organic solutions.

The novel crosslinking water-borne dispersions are similar to those used in the art for making magnetic recording media in that they include a water-borne polymer and an agent for crosslinking the polymer. As in the above-cited defensive publication, the polymer has functional groups such as active-hydrogen, epoxy or epithio, the last of these not being suggested by the defensive publication. The novel crosslinking water-borne dispersions differ from those of the defensive publication in that the crosslinking agent is a polyfunctional aziridine.

The term "active-hydrogen" used herein is defined in terms of the well-known Tschugaeff-Zerewitinoff analytical technique, e.g., note J.A.C.S., 49, 2181 (1927).

Any polymer which has active-hydrogen, epoxy or epithio functional groups and coalesces into a strong, chemically-resistant film should be useful. Useful polymers may be obtained by copolymerizing monomers containing active-hydrogen groups with alkyl acrylates or methacrylates, styrene and/or butadiene, acrylonitrile, vinyl chloride, vinyl acetate or olefinic monomers such as ethylene. The alkyl acrylates and methacrylates may have 1–8 carbon atoms in the alkyl groups or mixtures may have an average of up to 8 carbon atoms in their alkyl groups. Useful functional groups include:

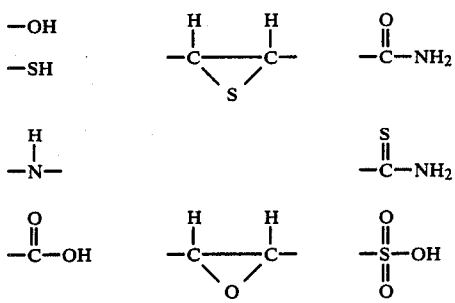

Carboxylic acid groups are especially useful. Good results have been attained using carboxylic acid monomers to provide one carboxylic acid group for every 20 to 250 atoms in the skeletal backbone chain of the polymer. If there were one carboxylic acid groups for less than every 20 atoms in the skeletal backbone, the raw materials would tend to become more expensive at no apparent advantage. In order to have less than one carboxylic acid groups for every 250 skeletal atoms, it may be desirable that some other binder-toughening phenomenon take place in addition to crosslinking by the polyfunctional aziridine. For example, additional crosslinking may be initiated at double bonds in the polymer, as by electron beam. Supplemental binder-toughening could also be accomplished by using the polyfunctional aziridine to couple two or more incompatible polymers to form a phase-separated binder.

Primary and secondary amine groups and hydroxyl and phenolic groups react more slowly with the crosslinking agent than do carboxylic acid groups. The other above-identified groups tend to be even slower.

The polyfunctional aziridine may be any of the alkylenimine derivatives disclosed in U.S. Pat. No. 3,225,013 (Fram) and may have the formula:

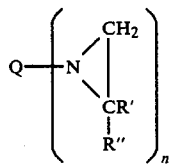

where Q is a n-valent radical, n is at least 2 (preferably 3 or 4), N is preferably linked to an atom having a valence of 4 or 5 (most preferably C or P), and each R' and R" is hydrogen or an alkyl group which is preferably a lower alkyl group having from 1 to 8, preferably from 1 to 4, carbon atoms. Q may be an aliphatic, aromatic or alicyclic organic radical which may contain atoms such as oxygen, sulfur, nitrogen, etc. Q may also be an inorganic radical, such as

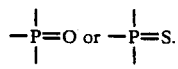

Q preferably is

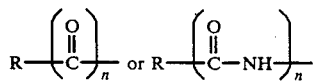

-continued

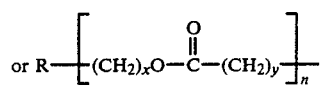

where R is an n-valent aliphatic, aromatic or alicyclic radical which may contain atoms other than carbon, e.g., oxygen, nitrogen or sulfur, and each of x and y is 0 or 2.

The polyfunctional aziridine is usually employed at 2–25% by weight of the polymer. Below 2%, the polymer may not become sufficiently crosslinked to provide desirably good resistance to wear and blocking.

Normally it is preferred that the functionalities of the polymer and polyfunctional aziridine be approximately equal. However, there usually is no difference in result if the polymer contains excess functional groups, and in some cases the excess functional groups may produce beneficial results. For example, excess carboxylic acid groups should have a reinforcing effect by virtue of bonds between the polymer and the dispersed inorganic particles. Any excess polyfunctional aziridine will usually hydrolyze to a secondary amine that should react with the remaining aziridine so that there should be no adverse consequences.

Upon using the novel water-borne dispersions of inorganic particles, polymer and polyfunctional aziridine to make flexible magnetic recording tape, the wet coating can initially be exposed to rather high air temperatures because the evaporating water effectively cools the backing. For example, if the wet coating is passed through an air-circulating oven at an air temperature of 225° C., the actual temperature of the backing is not likely to exceed 40° C. until more than 80% of the water has evaporated. At that point, it usually is desirable to convey the coated backing member into a cooler oven, e.g., 95° C. air temperature, to avoid distortion to the backing member. As soon as the water has substantially volatilized, the coated tape can be wound upon itself into roll form, although it is usually desirable to pass it through a zone of ordinary room temperature for about 30 seconds before the windup. At this point, the polymer of the coating should be substantially completely crosslinked if it included carboxylic acid groups. If the functional groups of the polymer are less reactive than carboxylic acid groups, it may be desirable to heat the coatings for a period of time after the water has volatilized and before the windup. Alternatively it may be sufficient merely to store the wound tape for a week or more at ordinary room temperatures before use.

As is common in the use of crosslinking agents, the polyfunctional aziridine should be added to the water-borne dispersion immediately prior to coating. Usually the polyfunctional aziridine should first be diluted with water to avoid coagulation upon adding it to the dispersion. In order to improve the compatibility, the polyfunctional aziridine may also be diluted with some organic solvent such as isopropanol and/or 2-butoxyethanol, preferably in amount not exceeding ten percent by weight of the nonvolatile components of the dispersion. After adding the polyfunctional aziridine, the pH is preferably kept above about 7, e.g., by adding a small quantity of a volatile amine that will largely evaporate during drying. A pot life of 24 to 48 hours is usually attainable.

Various types of both magnetizable and non-magnetizable inorganic particles such as carbon black and aluminum oxide have been successfully coated in the practice of the present invention. The novel water-borne dispersions can be coated out at least as conveniently and economically as can comparable organic-solvent-borne dispersions. Raw materials for the novel water-borne dispersions are readily available commercially at reasonable cost. Resistance to wear and blocking of the coatings is excellent. Furthermore, when employing the widely used biaxially-oriented polyethylene terephthalate film backing, the performance of coatings from the novel water-borne dispersions may be significantly improved over coatings from solvent-borne dispersions since cyclic oligomers, principally trimers, can be extracted from the film backing by the organic solvent and can then begin to migrate to and crystallize on the surface of the recording layer. The novel water-borne dispersions show little or no tendency for such extraction from polyethylene terephthalate film backings.

Cling Value

It has been found that the following test is useful in predicting a type of failure in which exposure of a roll of flexible magnetic recording tape to certain ambient conditions can result in an undesirable layer-to-layer cling. The cling problem can manifest itself in tension variations as the tape is unwound. Tape to be tested is firmly wound at 1.5 to 2.5 oz (40–70 g) tension on a 4.5-inch (11.4-cm) hub to a roll diameter of 7.5 to 10.5 inches (19–27 cm). The roll is successively conditioned at 21°±3° C. and 50%±10% RH for 24 hours; at 52°±1° C. and less than 5% RH for 1 hour; at 40° ±2° C. and 94%±4% RH for 24 hours; at 52°±1° C. and less than 5% RH for 2 hours; and at 21°±3° C. and 50%±10% RH for a minimum of 2 hours. While positioned on a horizontal spindle at the last-mentioned condition, tape is unwound and cut at the roll when a radial thickness of 1.5 to 3 cm of the tape remains on the hub. The roll is then rotated in the unwind direction until the free end of the tape rises to the height of the spindle. Unwinding is continued while the free end is separated from the roll until the weight of the unwound tape effects self-unwinding. The length of unwound tape is recorded as a Cling Value. If the Cling Value for ¼-inch (0.6-cm) tape is less than 20 cm, there should be no cling problem. If there is self-unwinding before the free end of the tape rises to the height of the spindle, the Cling Value is 0 cm.

The polyfunctional aziridine used in Examples 1–10 is believed to have the formula

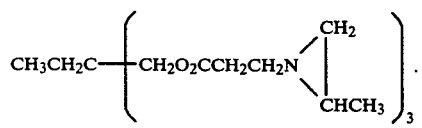

It was obtained as "CX-100" from Polyvinyl Chemical Industries.

In the examples, all parts are by weight.

EXAMPLE 1

A mill was charged with 100 parts of an acicular gamma iron oxide with a 5:1 aspect ratio and a 0.4-micrometer mean length, two parts of a dispersant, two parts of N,N-dimethylaminoethanol and 120 parts of deionized water. After the resulting slurry was milled until smooth, 75.5 parts of an emulsion of a copolymer (33.5% solids in water) was added. The copolymer had been emulsion-polymerized from 60 parts butyl acrylate, 20 parts methyl methacrylate, 15 parts 2-hydroxyethyl acrylate, 5 parts methacrylic acid and 0.05 part t-dodecyl mercaptan. To the copolymer-containing slurry was added 2.6 parts of polyfunctional aziridine and 3 parts of a fatty acid ester lubricant to provide a water-borne dispersion which was filtered, deaerated and knife coated onto an air-plasma-primed, biaxially-oriented polyethylene terephthalate film of 23 micrometers thickness. The wet coating was magnetically oriented in the longitudinal direction and subsequently dried in an oven at about 90° C. for 120 seconds. After polishing, the coated film was slit into standard magnetic recording tape widths.

EXAMPLES 2–10

Additional magnetic recording tapes were prepared as in Example 1 except using emulsions of different polymers and in some cases adjusting the slurry as indicated below. The polyethylene terephthalate film of Examples 3–6 was unprimed and in Example 7 had been corona-primed and provided with a subbing layer consisting of electrically-conductive carbon particles in a polymeric binder. Because of the subbing layer, it was difficult to measure the thickness of the magnetizable coating, and hence also its $B_r$, so that these values as reported in Table I below are based in part upon estimates.

In Example 2: 85.3 parts of an acrylic polymer hydrosol (30% solids) having pendant carboxylic acid groups (Acid No. 32). The hydrosol was obtained from E. I. duPont de Nemours & Co. as "EP 7015" having $T_g$ of 60° C.

In Example 3: Mixture of two acrylic emulsions, namely 22 parts of "WL-81" (41.5% solids) and 40 parts of "E-1284" (45.5% solids), both supplied by Rohm & Haas. Each had pendant carboxylic acid groups. This mixture of emulsions was diluted with 20 parts deionized water before being added to the slurry of magnetizable particles. The "WL-81" and "E-1284" had $T_g$ of 59° to 79° C. and −10° to 0° C., respectively. The "WL-81" provided a hardness to the binder and the "E-1284" provided a softness, thus permitting a desired degree of hardness to be obtained by adjusting their relative proportions. In the slurry 2-amino-2-methyl-1-propanol was used instead of the N,N-dimethylaminoethanol.

In Example 4: 74.4 parts of aqueous colloidal dispersion of an aliphatic polyurethane (34% solids) having pendant carboxylic acid groups (Acid No. 29.5) available as "R-960" from Polyvinyl Chemical Industries. Its $T_g$ was 45° C.

In Example 5: 72.3 parts of aqueous emulsion of a fully reacted polyurethane (35% solids) having secondary amine groups available as "Witcobond W-160" from Witco Chemical Co. Its $T_g$ was −45° to −49° C.

In Example 6: 35.2 parts of a water-reducible acrylic resin (70% solids in isopropanol) having pendant carboxylic acid groups (Acid No. 70) available as "Arolon 557-D70" from Ashland Chemical Co. was diluted with 44.1 parts of deionized water and 2.9 parts of triethylamine before being added to the slurry of magnetizable particles (which differed from the slurry of Example 1 in that it contained 2 parts of triethylamine instead of the N,N-dimethylaminoethanol).

In Example 7: Water-borne latex of a copolymer prepared from

| | Parts |
|---|---|
| deionized water | 100 |
| n-butyl acrylate | 25 |
| methyl methacrylate | 45 |
| 2-hydroxyethylacrylate | 14 |
| methacrylic acid | 10 |
| glycidyl methacrylate | 6 |
| t-dodecyl mercaptan | 0.05 |

This latex by itself would be self-crosslinking, but the presence of the polyfunctional aziridine in the coating dispersion provided further crosslinking in order to provide a tape having a desirably low value in the Cling Test.

In Example 8: 45.7 parts of a carboxylated styrene-butadiene emulsion (48% solids) believed to be about 51% styrene, 45% butadiene, and 4% itaconic acid obtained from Dow Chemical Company as "XD 30295". Two parts of a fatty acid ester were used as the lubricant.

In Example 9: 135.7 parts of aqueous colloidal dispersion of a copolymer of ethylene and acrylic acid (30% solids) available as "XD 8931" from Dow Chemical Company, 1.7 parts of 2-butoxyethanol ("Butyl Cellosolve"), and 3.3 parts of a 10% solution of fluorochemical surfactant.

In Example 10: 88 parts of a colloidal dispersion of a sulfonated polyester (30% solids in 80/20 water/isopropanol) available as "WD Size" from Eastman Chemical Products, Inc. and 17.7 parts deionized water.

EXAMPLE 11

A magnetic recording tape was prepared in the same manner as in Example 1, except using a polyfunctional aziridine which is believed to be a mixture of:

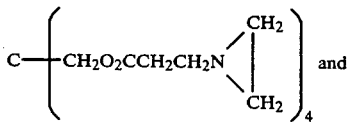

and

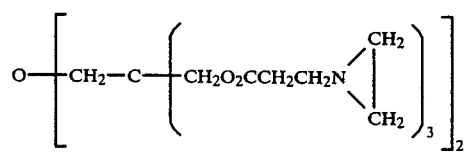

It was obtained from Cordova Chemical Co. as "XAMA-7".

EXAMPLE 12

The example employed the following polyfunctional aziridine:

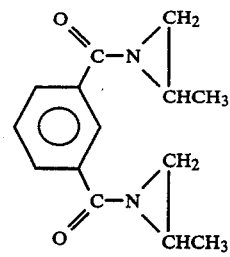

Because this polyfunctional aziridine does not dissolve in water, it was dispersed in equal parts of water. A magnetic recording tape was prepared as in Example 1 except using this different polyfunctional aziridine and that the polyethylene terephthalate film was unprimed and 80 parts of the emulsion were employed.

EXAMPLE 13

This example was identical to Example 9 except for using the following polyfunctional aziridine:

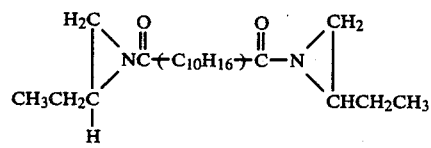

EXAMPLE 14

This example was identical to Example 9 except for using the following polyfunctional aziridine:

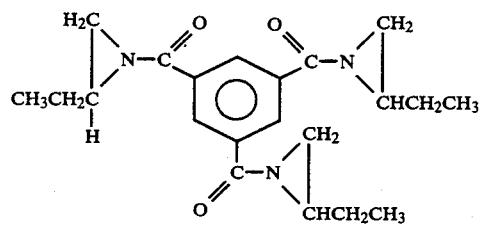

The amounts of the polyfunctional aziridine employed in making the magnetic recording tapes of Examples 1–11 and results of tests on the tapes are reported in Table I.

TABLE I

| Example | Parts of Aziridine | Coating Thickness (micrometers) | $B_r$ (Gauss) | $H_c$ (Oe) | Squareness |
|---|---|---|---|---|---|
| 1 | 2.6 | 8.2 | 1050 | 326 | 0.75 |
| 2 | 3 | 8.2 | 925 | 322 | 0.78 |
| 3 | 1.3 | 10.6 | 1000 | 340 | 0.76 |
| 4 | 1.4 | 12.2 | 1010 | 350 | 0.79 |
| 5 | 1.4 | 8.2 | 1190 | 337 | 0.79 |
| 6 | 4.2 | 7.95 | 1025 | 350 | 0.75 |
| 7 | 1.3 | 8.5 | 1100 | 342 | 0.82 |
| 8 | 0.93 | 8.4 | 1510 | 324 | 0.79 |
| 9 | 1.3 | 10.7 | 1040 | 327 | 0.81 |
| 10 | 2.7 | 10.2 | 1110 | 333 | 0.74 |
| 11 | 2.6 | 7.9 | 1020 | 319 | 0.75 |
| 12 | 2 | 7.9 | 1190 | 322 | 0.78 |
| 13 | 2 | 10.7 | 1130 | 323 | 0.77 |
| 14 | 2 | 9.4 | 1180 | 321 | 0.77 |

Each of the tapes of Examples 1–7, 9 and 11–14 exhibited excellent resistance to blocking as measured by the procedure of GSA-FSS Interim Federal Specification W-T-001572 Section 4.4.8, May 17, 1972, except after conditioning at 66° C./80% RH. The resistance to blocking of the tapes of Examples 8 and 10 was as good as that of many magnetic recording tapes now on the market. Each of the tapes of Examples 1–7 and 9–13 exhibited excellent resistance to wear at ordinary ambient conditions. That of the tape of Example 8 was fair and about equal to that of some audio tapes now on the market but not as good as many.

Only the tapes of Examples 4 and 7 were subjected to the Cling Test with the following results (minimum length of free tape to cause roll to unwind spontaneously)

| Example 4 | 3 cm |
| Example 7 | 0 cm. |

Resin Mixture A 100 parts of the water-reducible acrylic resin (70% solids in isopropanol) of Example 6
125.3 parts of deionized water
8.2 parts of triethylamine

EXAMPLES 15–18

Magnetic recording tapes were made as in Example 1 except that the polyethylene terphthalate film was unprimed and that Resin Mixture A was used in place of the emulsion and differing amounts of the polyfunctional aziridine were used as indicated in Table II:

TABLE II

| Example | Parts of Resin Mixture A | Amount of Aziridine Parts | % of polymer |
|---|---|---|---|
| 15 | 93 | 2.7 | 10 |
| 16 | 89 | 3.8 | 15 |
| 17 | 85.3 | 4.7 | 20 |
| 18 | 82 | 5.8 | 25 |

Each of the tapes of Examples 15–18 exhibited excellent resistance to blocking after conditioning at 66° C./80% RH. The tapes of Examples 17 and 18 exhibited excellent resistance to wear at ordinary ambient conditions. The resistance to wear of the tape of Example 16 was quite good, although not as good as that of the tapes of Examples 1–7, 9–11 and 17–18. The resistance to wear of the tape of Example 15 was fair and about equal to that of the tape of Example 8. The lesser resistance to wear of the tape of Example 15 compared to the tapes of Examples 16–18 is attributable to the fact that in Example 15, the functionality of the aziridine was about 30% below that of the polymer.

Comparative Tape

A magnetic recording tape similar to those of Examples 15–18 except omitting the polyfunctional aziridine had extremely poor resistance to wear. It blocked after conditioning at 66° C./80% RH, and another sample blocked after conditioning at 50° C./85% RH.

Table III reports results of tests on the tapes of Examples 15–18:

| Example | Coating Thickness (micrometers) | $B_r$ (Gauss) | $H_c$ (Oersted) | Squareness |
|---|---|---|---|---|
| 15 | 7.4 | 1090 | 334 | 0.77 |
| 16 | 7.9 | 1040 | 329 | 0.77 |
| 17 | 10.9 | 960 | 334 | 0.77 |
| 18 | 7.4 | 920 | 333 | 0.77 |

EXAMPLES 19 and 20

Two tapes with a magnetizable coating similar to that of Example 7 except with an oxide weight loading of 80% and 0.66 parts of aziridine crosslinker were prepared as in Example 1. Subsequently a coating was applied to the back surface of each as follows:

In Example 19: A mill was charged with 100 parts of conductive carbon black ("Vulcan XC-72"), 20 parts dispersant, 4 parts N,N-dimethylaminoethanol, and 280 parts deionized water. After the resulting slurry was milled until smooth, 230 parts of the urethane dispersion described in Example 4 was added together with 4 parts of the polyfunctional aziridine of Example 1–10 and 698 parts deionized water.

In Example 20: An aqueous colloidal dispersion of an aromatic urethane (34% solids) supplied by Spencer Kellogg Division of Textron, Inc. as "XP-4578" was substitued for the urethane dispersion of Example 19.

The backside coatings of each of Examples 19 and 20 were applied using a knife-coater and dried in an oven at about 90° C. for 120 seconds to a dried thickness of about 2.3 micrometers. Each backside coating was very strongly adherent and had a resistivity of about 1000 ohms per square. Both tapes had excellent blocking resistance after conditioning at 66° C./80% RH.

I claim:

1. A method of making a magnetic recording medium comprising a backing member and a magnetizable layer, which method comprises the steps of
    (1) preparing a dispersion of inorganic particles in a water-borne polymer having active-hydrogen, epoxy or epithio functional groups,
    (2) adding a crosslinking agent to the dispersion, and
    (3) coating the thus-modified dispersion onto the backing member, wherein the improvement comprises:
    the crosslinking agent is a polyfunctional aziridine having the formula

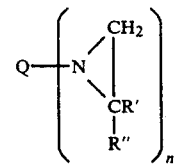

where Q is a n-valent inorganic or aliphatic, aromatic or alicyclic organic radical, n is at least 2, and each of R′ and R″ is hydrogen or alkyl.

2. A method as defined in claim 1, wherein the improvement further comprises:
said inorganic particles are magnetizable particles.

3. A method as defined in claim 1, wherein the improvement further comprises:

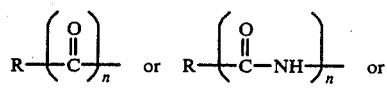

or

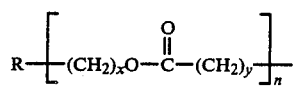

where R is an n-valent aliphatic, aromatic or alicyclic radical, and each of x and y is 0 or 2.

4. A method as defined in claim 3, wherein the improvement further comprises:
the polyfunctional aziridine is

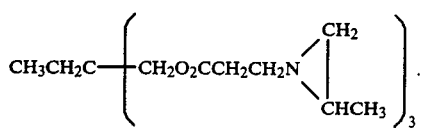

5. Magnetic recording medium made by a method as defined by claims 1 or 2.

6. Magnetic recording medium comprising a backing member carrying a water-borne layer of inorganic particles in a binder comprising a crosslinked polymer which had active-hydrogen, epoxy or epithio functional groups, wherein the improvement comprises:
the crosslinking agent was a polyfunctional aziridine having the formula

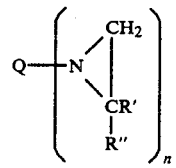

where Q is a n-valent inorganic or aliphatic, aromatic or alicyclic organic radical, n is at least 2, and each of R' and R'' is hydrogen or alkyl.

7. Magnetic recording medium as defined in claim 6 wherein said inorganic particles are magnetizable particles.

8. A water-borne dispersion for making coatings of magnetic recording media, said dispersion comprising inorganic particles, a water-borne polymer having active-hydrogen, epoxy or epithio functional groups, and 2-25% by weight of said polymer of a polyfunctional aziridine crosslinking agent having the formula

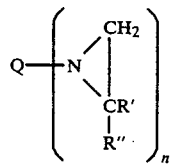

where Q is a n-valent inorganic or aliphatic, aromatic or alicyclic organic radical, n is at least 2, and each of R' and R'' is hydrogen or alkyl.

9. A coatable dispersion of inorganic particles in a water-borne polymer for making coatings of magnetic recording media, which polymer has active-hydrogen, epoxy or epithio functional groups, wherein the improvement comprises:
the dispersion includes 2-25% by weight of said polymer of a polyfunctional aziridine crosslinking agent having the formula

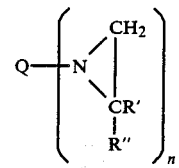

where Q is n-valent inorganic or aliphatic, aromatic or alicyclic organic radical, n is at least 2, and each of R' and R'' is hydrogen or alkyl.

10. A dispersion as defined in claim 8, wherein said inorganic particles are magnetizable particles.

11. A dispersion as defined in claim 10, wherein Q is

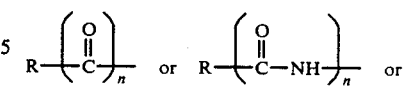

or

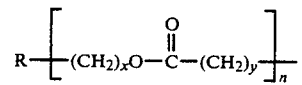

where R is an n-valent aliphatic, aromatic or alicyclic radical, and each of x and y is 0 or 2.

12. A dispersion as defined in claim 11, wherein the polyfunctional aziridine is

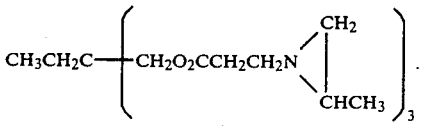

13. A method of making a magnetic recording medium comprising a backing member and a magnetizable layer, which method comprises the steps of
(1) preparing a dispersion of inorganic particles in a water-borne polyurethane having pendant carboxylic acid groups,
(2) adding a polyfunctional aziridine crosslinking agent to the dispersion, and
(3) coating the thus-modified dispersion onto the backing member, said polyfunctional aziridine having the formula

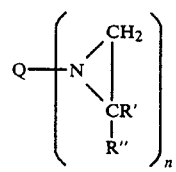

where Q is a n-valent inorganic or aliphatic, aromatic or alicyclic organic radical, n is at least 2, and each of R' and R'' is hydrogen or alkyl.

14. A method as defined in claim 13, wherein said inorganic particles are magnetizable particles.

15. Magnetic recording medium comprising a backing member carrying a water-borne layer of inorganic particles in a binder comprising a crosslinked polyurethane having pendant carboxylic acid groups, wherein the crosslinking agent was a polyfunctional aziridine having the formula

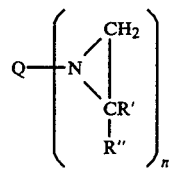

where Q is a n-valent inorganic or aliphatic, aromatic or alicyclic organic radical, n is at least 2, and each of R' and R" is hydrogen or alkyl.

16. Magnetic recording medium as defined in claim 15, wherein said inorganic particles are magnetizable particles.

17. An aqueous coating composition for forming a magnetic recording layer, said coating composition comprising an aqueous dispersion of magnetic pigment, polyurethane with carboxylic acid groups on the backbone chain, and a polyfunctional crosslinking agent for said polyurethane.

18. The coating composition of claim 17 in which said crosslinking agent comprises a polyfunctional aziridine.

19. A water-born dispersion for forming a magnetic recording layer, said dispersion having a pH above about 7 and comprising magnetizable particles, polyurethane having pendant carboxylic acid groups, and a polyfunctional crosslinking agent for said polyurethane.

20. The dispersion of claim 19 in which said crosslinking agent comprises a polyfunctional aziridine.

21. A method as defined in claim 1, wherein the improvement further comprises:
said polyfunctional aziridine is employed at 2–25% by weight of said polymer.

22. Magnetic recording medium as defined in claim 6 wherein said polyfunctional aziridine was employed at 2–25% by weight of said polymer.

* * * * *

UNITED STATES PATENT AND TRADEMARK OFFICE
CERTIFICATE OF CORRECTION

PATENT NO. : 4,490,505

DATED : December 25, 1984

INVENTOR(S) : Daniel B. Pendergrass, Jr.

It is certified that error appears in the above-identified patent and that said Letters Patent is hereby corrected as shown below:

Col. 9, line 6, "and 9-13" should read -- and 9-14 --.

Signed and Sealed this

Thirty-first Day of December 1985

[SEAL]

Attest:

DONALD J. QUIGG

Attesting Officer

Commissioner of Patents and Trademarks